(12) United States Patent
Sabin et al.

(10) Patent No.: US 10,077,195 B2
(45) Date of Patent: Sep. 18, 2018

(54) SPOUT WITH REVERSED FLOW

(71) Applicant: LVD Acquisition, LLC, Columbus, OH (US)

(72) Inventors: Stephen John Sabin, Ballina (IE); John Francis Kennedy, Tubbercurry (IE); Louis Busick, Westerville, OH (US)

(73) Assignee: LVD Acquisition, LLC, Columbus, OH (US)

( * ) Notice: Subject to any disclaimer, the term of this patent is extended or adjusted under 35 U.S.C. 154(b) by 69 days.

(21) Appl. No.: 15/483,103

(22) Filed: Apr. 10, 2017

(65) Prior Publication Data
US 2017/0210642 A1     Jul. 27, 2017

Related U.S. Application Data

(63) Continuation of application No. 14/464,181, filed on Aug. 20, 2014, now abandoned, which is a continuation of application No. PCT/US2013/027310, filed on Feb. 22, 2013.

(60) Provisional application No. 61/602,376, filed on Feb. 23, 2012.

(51) Int. Cl.
*C02F 1/32* (2006.01)
*B65D 47/06* (2006.01)

(52) U.S. Cl.
CPC .............. *C02F 1/325* (2013.01); *B65D 47/06* (2013.01); *C02F 2201/328* (2013.01); *C02F 2201/3227* (2013.01); *C02F 2303/04* (2013.01); *C02F 2307/06* (2013.01)

(58) Field of Classification Search
CPC ...... C02F 1/32; C02F 1/325; C02F 2201/328; C02F 2201/3227; C02F 2307/06; B65D 47/06

USPC .......................................................... 210/94
See application file for complete search history.

(56) References Cited

U.S. PATENT DOCUMENTS

| | | | | |
|---|---|---|---|---|
| 4,267,455 A | * | 5/1981 | Keller | ........................ A61L 2/10 210/192 |
| 5,316,673 A | | 5/1994 | Kohlmann et al. | |
| 5,390,828 A | * | 2/1995 | Gross | ..................... B65D 47/26 222/211 |
| 6,139,726 A | | 10/2000 | Greene | |

(Continued)

FOREIGN PATENT DOCUMENTS

DE     29802771 U1    8/1998

*Primary Examiner* — Heidi R Kelley
*Assistant Examiner* — Akash K Varma
(74) *Attorney, Agent, or Firm* — Standley Law Group LLP

(57) ABSTRACT

A spout that dispenses water from a water dispenser has a disinfection portion that provides two passes of the water therethrough. The disinfection portion has two flow tubes, the second arranged inside the first, so that an annular cross-section flow path is defined by an inside wall of first tube and an outside wall of the second tube. A second flow path having a circular cross-section is defined by an inside wall of the second tube. The water flow is transferred between the flow at a second end of the disinfection portion by a second end portion. At a first end portion, located at a first end of the disinfection portion, a first end portion body provides connections to the disinfection section for both an inlet and an outlet. The order of flow through the disinfection portion flow paths may depend upon the orientation of the spout.

9 Claims, 2 Drawing Sheets

(56) References Cited

U.S. PATENT DOCUMENTS

2011/0309032 A1* 12/2011 Makl ................. A61L 2/10
                                                  210/748.1

\* cited by examiner

SPOUT WITH REVERSED FLOW

CROSS-REFERENCE TO RELATED APPLICATIONS

This application is a continuation of, and claims priority to, U.S. Ser. No. 14/464,181, filed on 20 Apr. 2014, which is a bypass continuation of PCT/US2013/027310, filed 22 Feb. 2013, which in turn claims priority to U.S. 61/602,376, filed on 23 Feb. 2012. Each of these applications is incorporated by reference as if fully recited herein.

TECHNICAL FIELD

The disclosed embodiments of the present invention relate to a spout for a water dispenser, particularly a spout adapted for ultraviolet ("UV") disinfection of the water.

BACKGROUND OF THE ART

Ultraviolet radiation can be effectively used as a means for a final disinfection of water being dispensed from a water source.

In order to be fully effective, the ultraviolet radiation source must act upon the water up to and including the point at which the water actually exits the spout. A portion of water residing just inside the spout can be exposed to contamination if this does not happen.

The amount of time for the UV source to reach an effective power level after being energized will vary, depending upon the specifics of the UV source used. A consequence of this is that many water dispensing units will keep the UV source energized. While this maintains the disinfection level of the water, it also raises the temperature of the water in the disinfection zone. This is an undesired effect, particularly when the first portion of water being dispensed from a water cooler is actually warmer than ambient. One way to minimize this effect is to limit the volume of water in the disinfection zone when no flow is occurring. However, there are also normal flow rates expected by consumers when using the dispenser. If the volume of water subject to disinfection at any point is being minimized, then the residence time in the disinfection zone is also very low, reducing the effect of the UV radiation.

It is therefore an unmet advantage of the prior art to provide a spout for a water dispensing unit that extends the UV radiation as close to the tip of the spout as possible, minimizes the amount of water dispensed at a temperature above ambient, and provides the needed residence time to disinfect, while maintaining an acceptably high flow rate.

SUMMARY OF THE INVENTION

This and other unmet advantages are provided by a spout for dispensing water from a water dispenser. Such a spout comprises three portions: a disinfection portion, a first end portion and a second end portion. The first and second end portions are positioned, respectively, at a first and second end of the disinfection portion.

The disinfection portion has first and second tubes, open at each end, with a second tube arranged longitudinally inside the first tube. As a result, the tubes define two flow paths, the first flow path having an annular cross-section defined by an inside wall of first tube and an outside wall of the second tube and the second flow path having a circular cross-section defined by an inside wall of second tube. In operation, water being disinfected just prior to being dispensed makes two passes through the disinfection portion, with one pass in each of the flow paths.

Water being dispensed enters and exits the spout through the first end portion, the body of which is connected to the first end of the disinfection portion. The first end portion also has an inlet through which water enters the spout from a water source of the water dispenser and an outlet, though which the water is dispensed after being disinfected. The internal configuration of the first end portion body communicates the inlet to one of the disinfection portion flow paths and the outlet to the other.

The second end portion has a second end portion body that is connected to the second end of the disinfection portion. It has an interior configuration that connects the respective flow paths of the disinfection portion.

It is preferred that each of the tubes comprises a material that is substantially transparent to ultraviolet (UV) radiation. One such material is quartz glass.

In one configuration of the spout, which may be particularly useful when the spout is to have the disinfection portion mounted vertically in the water dispenser, the water flow is upward through the annular flow path and downward through the circular flow path. The first end portion body is generally hollow with a cylindrical outer wall. The inlet extends radially outwardly from the first end portion body and is in liquid communication with the interior of the first end portion body so that water entering through the inlet passes into the annular first flow path of the disinfection portion. The outlet extends axially from the first end portion body and the interior of the first end portion body is arranged to pass water from the circular second flow path of the disinfection portion to the outlet. At the second end portion, the flow is directed from the annular first flow path into the circular second flow path of the disinfection portion. As this may draw a vacuum as the water flows down and out through the outlet, it may be useful to install a check valve in the second end portion body to allow air flow into the second end portion body, relieving the vacuum.

In another configuration of the spout, which may be particularly useful when the spout is to have the disinfection portion mounted horizontally in the water dispenser, the water flows first through the circular flow path and then through the annular flow path, which will lie lower (although only slight) than the circular flow path. In this embodiment, the first end portion body is generally hollow with a cylindrical outer wall. The inlet extends axially outwardly from the first end portion body. The inlet is in liquid communication with the interior of the first end portion body so that water entering through the inlet passes into the circular second flow path of the disinfection portion. The second end portion body is arranged to transfer water from the circular first flow path of the disinfection portion into the annular second flow path of the disinfection portion. The outlet in this case extends radially, and, preferably, downwardly from the first end portion body to dispense the water. The interior of the first end portion body is arranged to pass water from the annular first flow path of the disinfection portion to the outlet.

In either of the embodiments, at least one source of UV radiation will be arranged around the disinfection portion to bathe the water in UV radiation during each pass through the disinfection portion.

BRIEF DESCRIPTION OF THE DRAWINGS

A better understanding of the disclosed embodiments will be obtained from a reading of the following detailed description and the accompanying drawings wherein identical reference characters refer to identical parts and in which.

DETAILED DESCRIPTION OF A PREFERRED EMBODIMENT

Some general concepts can be discussed before covering specific embodiments. When UV disinfection is used in a water dispenser, it is common to conduct the process on a linear portion of the water flow path. In one type of system, not generally covered here, the UV radiation is generated in a central portion of the flow path, with the water flowing in an annular path that is radially outward from the UV source. In the second type of system, the water flow tube is the central feature and the UV radiation is arrayed circumferentially around the water flow tube, so that the UV radiation is directed radially inward, that is, in the opposite direction of the first type of system.

The inventive concept here presumes that generating UV radiation, especially for use in the second method, is known in the art and that designing a housing for the UV radiation source is within the knowledge of one of ordinary skill.

It is also important to initially note that the length of the flow tube required for an appropriate residence time may dictate whether the flow tube sits generally vertically or generally horizontally in the water dispenser. This may be of particular consequence when the overall disinfection unit, that is, a housing that incorporates the UV radiation source, necessary power and control apparatus, and the water flow tube, including its connections, has to be retrofitted into an existing dispenser design. For that reason, it is very useful to be able to provide a spout that can meet all disinfection requirements while being useful in either a horizontal or vertical orientation, even if it requires some changes in the installation.

Figure 1:
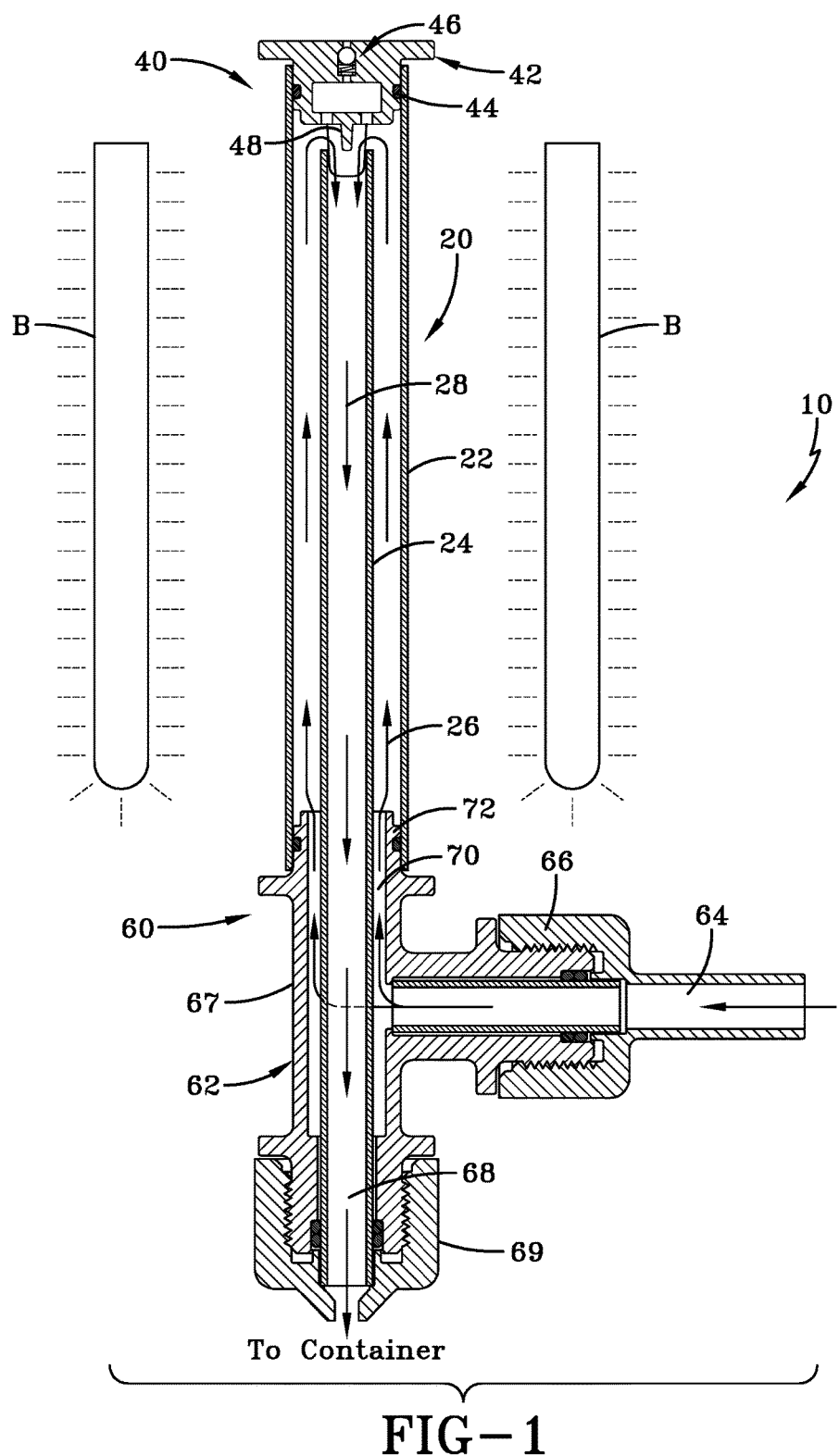
FIG. 1 is a side-sectional elevation view of a first embodiment, in which the spout arrangement is oriented for vertical use.

FIG. 1 shows a side sectional elevation view of a spout 10 that embodies the desired features, arranged for vertical orientation. Shown generally are two UV bulbs B, which are illustrated for environmental purposes only and are not part of the spout 10. Spout 10 can be broken down into a primary disinfection portion 20, bounded at one end by a second end portion 40 and at the other end by a first end portion 60.

In the primary disinfection portion 20, a first tube 22 provides the primary separation between the UV radiation, regardless of its source, and the water. At least in portion 20, tube 22 is effectively open on each end. A second tube 24 is positioned inside tube 22, preferably concentrically. Second tube 24 is also effectively open-ended, at least in portion 20. This arrangement provides two flow paths 26, 28 for water flow in portion 20. The first flow path 26 is an annular path between an inside wall of first tube 22 and an outside wall of second tube 24. The second flow path 28 is a path with a circular cross-section, defined by an inside wall of second tube 24. Presuming an arrangement of UV radiation sources B around the circumference of first tube 22 in portion 20, as well as the possibility of a reflective surface (not shown) radially outwardly from the radiation sources, the first tube is bathed in UV radiation. To assist the UV radiation in reaching the water flowing in tubes 22, 24, each of the tubes will preferably be highly transparent to light in the UV portion of the electromagnetic spectrum. As an example, quartz glass is an excellent material for this purpose.

As will be seen, the preferred direction of flow in the two flow paths 26, 28 will be determined by the orientation of the spout 10. In the vertical orientation, water preferably flows upwardly in flow path 26 and downwardly in flow path 28.

Moving then to the second end portion 40, it is noted that a second end body 42, typically formed from a polymeric material, operates as an end cap to close off the first tube 22. Since second tube 24 is not closed off at this end by second end body 42, then water flow moving annularly upward in flow path 26 reaches the second end body and must turn inwardly to flow downwardly in flow path 28, that is, inside the second tube. Although retaining the water during flow under normal flow pressures mandates that the second end body 42 is secured to first tube 22, it will also be preferred that the means for securing 44 selected is a means that can be easily opened or removed, so that the second end body, the first tube, or both, can be easily replaced. An example will be a friction fitting including elastomeric O-rings. In some instances, it will be very useful to install a check valve 46 in second end body 42, arranged to permit air flow from outside the first end body into the interior thereof. This can be used to relieve vacuum drawn inside the second end body 42 by water moving down flow path 28 immediately following a dispensing at the spout 10. Also, in some applications, it may be useful to provide a baffle 48 that extends, essentially along the longitudinal axis of the concentric tubes 22, 24 into the upper end of tube 24. This baffle 48 would serve to direct flow as it moves from flow path 26 to flow path 28 (or vice versa).

Turning at last to first end portion 60, the most functionally complex piece of the spout 10 is now described. Functionally, first end portion 60 is tasked with receiving water from an upstream portion of the water dispensing device, feeding the water into the disinfection portion 20, receiving the disinfected water back from the disinfection portion and dispensing the disinfected water to a user.

In the embodiment depicted in FIG. 1, first end body 62 has an inlet 64 that receives the water to be dispensed by the spout 10. Inlet 64 is adapted, as with a threaded fitting 66, for attachment to a feed line coming from the water supply. The water can be anywhere in the range of from above freezing to below boiling, depending upon the intended use and the water supply being used. As depicted, first end body 62 has a generally longitudinal shape, with inlet 64 extending radially outward from the first end body, which is generally hollow and defined by a cylindrical outer wall 67. First end body 62 also has an outlet 68, depicted as extending axially from the first end portion 60, from which the disinfected water is discharged. With regard to this outlet 68, second tube 24 extends axially from the disinfecting portion into the outlet, even to the extent that the second tube defines the inner wall of the outlet, allowing the end of second tube to be visually seen at the outlet. An outer wall 69 of the outlet 68 is adapted, if desired, to be fitted to a receiving vessel, although many embodiments may have simply a smooth outer wall for the outlet. It is highly preferred that the second tube 24 is well-secured to the outlet, and in some circumstances, the second tube 24 and outlet 68 will be provided as a unit that can be attached to the first end body 62.

Although the first tube 22 does not extend into the first end portion 60, as will be explained, the outer wall 67 of the first end body 62 and the second tube define an annular space 70, to which the inlet 64 is communicated. Water arriving through inlet 64 therefore is admitted to this annular space 70 and runs upwardly therethrough to the upper end 72 of the first end portion 60, where the first end portion and disinfecting portion 20 are joined.

Figure 2:
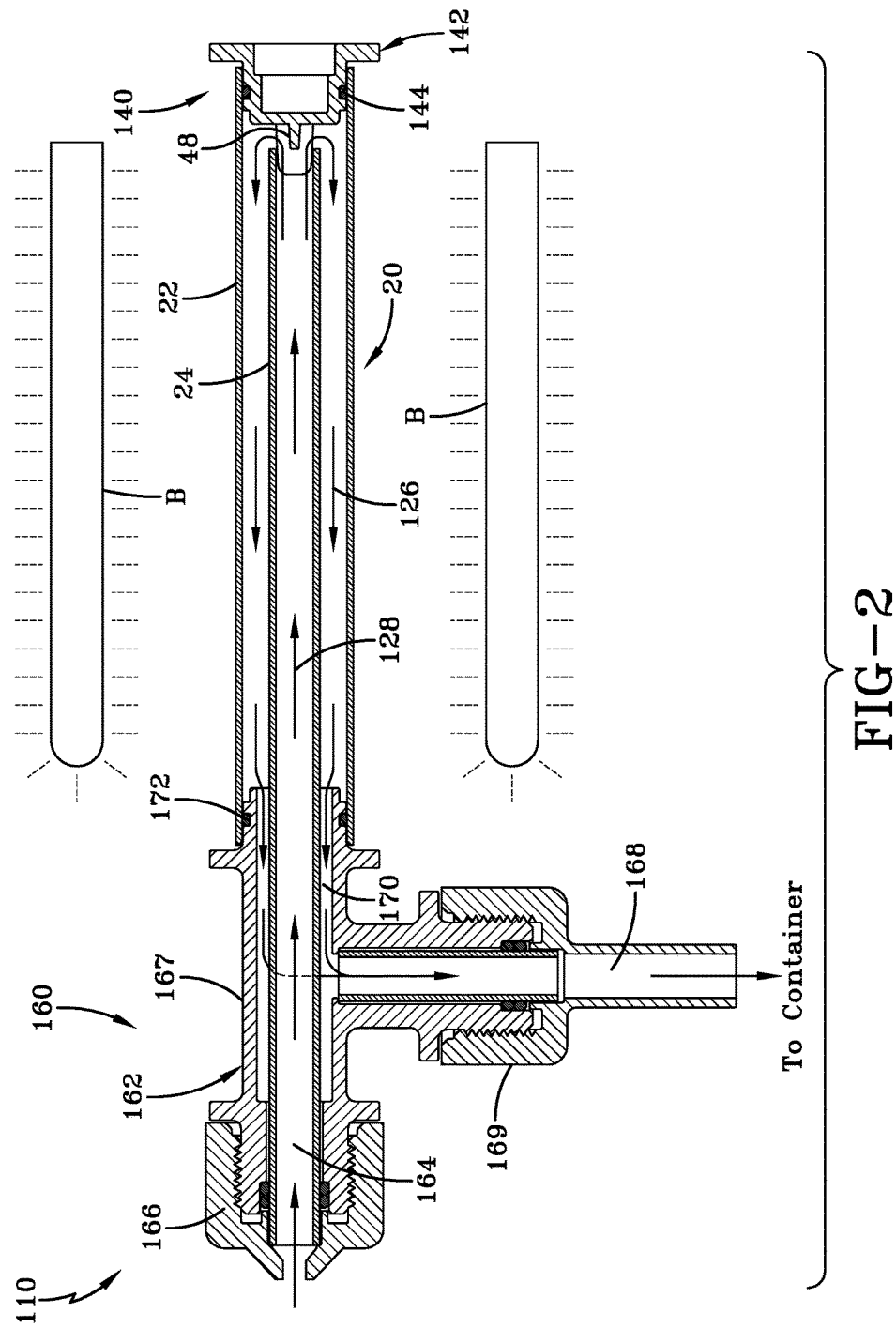
FIG. 2 is a side-sectional elevation view of a second embodiment, in which the spout arrangement is oriented for horizontal use.

FIG. 2 shows a side sectional elevation view of a spout 110 that embodies the desired features, arranged for horizontal orientation, which is required in some instances. Shown generally are two UV bulbs B, which are illustrated for environmental purposes only and are not part of the spout 110. Spout 110 can be broken down into a primary disinfection portion 20, bounded at one end by a second end portion 140 and at the other end by a first end portion 160.

Structurally, the primary disinfection portion 20 of spout 110 is identical to that used in spout 10 of FIG. 1. Functionally, flow patterns are different. The first tube 22 provides the primary separation between the UV radiation, regardless of its source, and the water. At least in portion 20, tube 22 is effectively open on each end. A second tube 24 is positioned inside tube 22, preferably concentrically. Second tube 24 is also effectively open-ended, at least in portion 20. This arrangement provides two flow paths 126, 128 for water flow in portion 20. The first flow path 126 is an annular path between an inside wall of first tube 22 and an outside wall of second tube 24. The second flow path 128 is a path with a circular cross-section, defined by an inside wall of second tube 24. Presuming an arrangement of UV radiation sources B around the circumference of first tube 22 in portion 20, as well as the possibility of a reflective surface (not shown) radially outwardly from the radiation sources B, tube 22 is bathed in UV radiation. To assist the UV radiation in reaching the water flowing in tubes 22, 24, each of the tubes will preferably be highly transparent to light in the UV portion of the electromagnetic spectrum. As an example, quartz glass is an excellent material for this purpose.

As noted previously, the preferred direction of water flow in the two flow paths 126, 128 is determined by the orientation of the spout 110. In the horizontal orientation of FIG. 2, the water enters portion 20 in flow path 128, moves horizontally (left to right in FIG. 2) to the end of portion 20 and then is shunted, inside first end portion 140 into flow path 126 for a return trip through portion 20, this time in the right to left direction.

Moving then to the second end portion 140, it is noted that a second end body 142, typically formed from a polymeric material, operates as an end cap that closes off first tube 22. Water moving in flow path 128 enters second end body 142, encounters the closed end and is turned radially outwardly into annular flow path 126. Although retaining the water during flow under normal flow pressures mandates that the second end body 142 is secured to tube 22, it will also be preferred that the means for securing 144 selected is a means that can be easily reversed, so that the second end body, the first tube, or both, can be easily replaced. An example of the securing means will be a friction fitting including elastomeric O-rings. Also, in some applications, it may be useful to provide a baffle 48 that extends, essentially along the longitudinal axis of the concentric tubes 22, 24 into the end of tube 24 at the first end body 142. This baffle 48 would serve to direct flow as it moves from flow path 128 to flow path 126.

Turning at last to first end portion 160, the most functionally complex piece of the spout 110 is now described. Functionally, first end portion 160 is tasked with receiving water from an upstream portion of the water dispensing device, feeding the water into the disinfection portion 20, receiving the disinfected water back from the disinfection portion and dispensing the disinfected water to a user.

In the FIG. 2 embodiment, first end body 162 has an inlet 164 that receives the water to be dispensed by the spout 110. Inlet 164 is adapted, as with a threaded fitting 166, for attachment to a feed line coming from the water supply. The water can be anywhere in the range of from above freezing to below boiling, depending upon the intended use and the water supply being used. As depicted, first end body 162 has a generally longitudinal shape, with inlet 164 extending axially outward from the first end body 162, which is generally hollow and defined by a cylindrical outer wall 167. First end body 162 also has an outlet 168, depicted as extending radially from the first end body, from which the disinfected water is discharged. With regard to inlet 164, second tube 24 extends axially from the disinfecting portion 20 into the first end portion 160 and into the inlet, even to the extent that the second tube defines the inner wall of the inlet, allowing the end of second tube to be visually seen at the inlet. Because some of the ultraviolet light inside the second tube 24 strikes the wall at a sufficient angle, internal reflection in the glass of the second tube will result in light being axially transmitted. This means that a certain portion of the disinfective capacity of the UV radiation will be available, even at the inlet 164. An outer wall 169 of the outlet 168 is adapted, if desired, to be fitted to a receiving vessel, although many embodiments may have simply a smooth outer wall for the outlet. It is highly preferred that the second tube 24 is well-secured to the inlet 164, and in some circumstances, the second tube 24 and inlet 164 will be provided as a unit that can be attached to the first end body 162.

Although the first tube 22 does not extend into the first body portion 160, the outer wall 166 of the first end body 162 and the second tube 24 define an annular space 170, into which water in flow path 126 flows. Annular space 170 is, in turn, connected to the outlet 168 is communicated. The disinfecting portion 20 and first end portion 160 are separably connected by a suitable attaching means 172.

In both embodiments 10, 110, but more particularly in embodiment 110, it will be understood that if first tube 22 is closed at one end, as in the shape of a test tube, it can be used alone, instead of with the respective first end body 42, 142. This is especially the case with embodiment 110, as there is less reason to provide a check valve 46, although an appropriately designed check valve could be used with a closed end first tube 22.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A water dispenser, comprising;
   a housing, having a plurality of ultraviolet ("UV") radiation sources arrayed circumferentially in the housing;
   a spout, mounted in an open central portion of the housing, such that the plurality of UV radiation sources are radially outward from the spout, the spout comprising:
   a disinfection portion, comprising a first tube and a second tube, arranged longitudinally inside the first tube such that the respective tubes define a first and a second flow path, the first flow path having an annular cross-section defined by an inside wall of the first tube and an outside wall of the second tube and the second flow path having a circular cross-section defined by an inside wall of the second tube, each of the tubes being open at each end thereof and comprising a material that is substantially transparent to ultraviolet (UV) radiation;

a first end portion, having a first end portion body connected to a first end of the disinfection portion, the first end portion comprising an inlet, adapted to receive water from a water source of the water dispenser; and an outlet; and a second end portion having a second end portion body, connected to a second end of the disinfection portion and having an interior arranged to transfer water from one of the disinfection portion flow paths to the other disinfection portion flow path;

wherein the spout and the UV radiation sources are separated from each other in the housing, allowing independent insertion and removal of the spout and the UV radiation sources.

2. The water dispenser of claim 1, wherein:
the spout is mounted in the housing such that the tubes in the disinfection portion extend generally vertically when in use.

3. The water dispenser of claim 1, wherein:
the spout is mounted in the housing such that the tubes in the disinfection portion extend generally horizontally when in use.

4. The water dispenser of claim 1, wherein:
the at least one source of UV radiation is mounted in the housing to irradiate water flowing in each of the two flow paths.

5. The water dispenser of claim 1, wherein:
each of the tubes comprises quartz glass.

6. The water dispenser of claim 5, wherein:
the first end portion body is generally hollow with a cylindrical outer wall;
the inlet extends radially outwardly from the first end portion body and is in liquid communication with the interior of the first end portion body so that water entering through the inlet passes into the annular first flow path of the disinfection portion;
the second end portion body is arranged to transfer water from the annular first flow path of the disinfection portion into the circular second flow path of the disinfection portion; and
the outlet extends axially from the first end portion body and the interior of the first end portion body is arranged to pass water from the circular second flow path of the disinfection portion to the outlet.

7. The water dispenser of claim 1, further comprising:
a check valve, located in the second end portion body and communicating the exterior and interior thereof to allow air flow into the second end portion body.

8. The water dispenser of claim 1, wherein:
the first end portion body is generally hollow with a cylindrical outer wall;
the inlet extends axially outwardly from the first end portion body and is in liquid communication with the interior of the first end portion body so that water entering through the inlet passes into the circular second flow path of the disinfection portion;
the second end portion body is arranged to transfer water from the circular first flow path of the disinfection portion into the annular second flow path of the disinfection portion; and
the outlet extends radially from the first end portion body and the interior of the first end portion body is arranged to pass water from the annular first flow path of the disinfection portion to the outlet.

9. The water dispenser of claim 1, wherein:
the first end portion body is generally hollow with a cylindrical outer wall;
the inlet extends radially outwardly from the first end portion body and is in liquid communication with the interior of the first end portion body so that water entering through the inlet passes into the annular first flow path of the disinfection portion;
the second end portion body is arranged to transfer water from the annular first flow path of the disinfection portion into the circular second flow path of the disinfection portion; and
the outlet extends axially from the first end portion body and the interior of the first end portion body is arranged to pass water from the circular second flow path of the disinfection portion to the outlet.

* * * * *